United States Patent [19]

Allen

[11] Patent Number: 4,499,991
[45] Date of Patent: Feb. 19, 1985

[54] AUTOMATED CONVEYOR SYSTEM

[76] Inventor: Dillis V. Allen, 1080 Nerge Rd., Suite 205, Elk Grove Village, Ill. 60007

[21] Appl. No.: 17,710

[22] Filed: Mar. 5, 1979

[51] Int. Cl.³ ............................................. B65G 37/00
[52] U.S. Cl. ................................... 198/472; 198/722; 198/781; 104/166
[58] Field of Search ............... 198/472, 786, 339, 572, 198/575, 577, 722, 742, 781, 341; 104/163, 166–168

[56] References Cited

U.S. PATENT DOCUMENTS

| | | | |
|---|---|---|---|
| 428,639 | 5/1890 | Siccardi | 104/167 |
| 2,837,223 | 6/1958 | Wolff | 104/167 |
| 3,118,393 | 1/1964 | Ohlin | 104/166 |
| 3,187,878 | 6/1965 | Harrison et al. | 198/572 |
| 3,473,645 | 10/1969 | Kidd | 198/341 |
| 3,527,087 | 9/1970 | Converse et al. | 198/339 |
| 3,591,241 | 7/1971 | Allen | 104/166 |
| 3,970,204 | 7/1976 | Lutz | 198/786 |
| 4,014,428 | 3/1977 | Ossbahr | 198/472 |
| 4,055,315 | 10/1977 | Gvelesiani | 104/168 |

FOREIGN PATENT DOCUMENTS 11114 of 1846 United Kingdom ............... 104/166

Primary Examiner—Joseph E. Valenza

[57] ABSTRACT

A conveyor system for conveying work pallets with workpieces from one machine tool to another in a machine tool line that has the capability of permitting work pallets to collect at any machine so that the machine tools throughout the system can operate at their own speed without waiting for the completion of an operation at another work station. This is accomplished by a plurality of individually controllable conveyor sections that drive the pallets with a plurality of resilient rollers arranged in a spiral fashion that engage a semi-cylindrical undersurface on the pallets in a non-positive drive fashion that prevents binding as the pallets move from one conveyor section to another. A control system is provided to selectively slow and stop each of the conveyor sections so that as the work pieces approach a machining station, they will automatically slow down and stop.

5 Claims, 8 Drawing Figures

AUTOMATED CONVEYOR SYSTEM

BACKGROUND OF THE PRESENT INVENTION

Automated machine tool lines became popular in heavy industry during the 1940's and 1950's, particularly in the automobile industry. These lines include machine tools spaced within the plant with conveyors extending between the tools for advancing work pallets having automobile parts thereon such as cylinder blocks or crank shafts from one machine to another without the interposition of any human manipulation. These pallets are usually evenly spaced upon the conveyor so that they can be indexed in step-by-step fashion simultaneously from one machine to another. When all of the machining operations at all the tools were completed, the work pieces were advanced one step and the process then repeated.

This system had the disadvantage that the machining time for the entire system was dependent upon and controlled by the machining time of the slowest machine on the line. The resulting disadvantage of this system, of course, is in hindsight the obvious resulting high machining costs.

To attempt to obviate these problems, many systems were developed only some of which have gained any significant commercial recognition. One solution is to provide what is termed a "universal machine" that can be programmed to perform the function of either a broken machine on the line or to share time on the line with the slowest machine on the line. This requires additional conveyor structure for alternately routing workpieces either on an alternate basis with the slowest machine, or on a permanent basis to the universal machine when one machine is completely down. Such a system significantly improves multiple machine tool line efficiency, but the basic slowness and delays created by step-by-step indexing of pallets continues to result in slow line performance. The reason for this is that even if the slow machine is assisted by a "universal machine", the next slowest machine, which may be only very slightly faster than the slow machine, controls the cycle time of the entire line. While additional "universal machines" may be provided to attempt to solve this problem, the provision of more machines results in diminishing returns from an economic viewpoint.

In recognizing these problems, there have been proposed in the last decade systems in which the work carriers "float" on the conveyor line and are not restricted to step-by-step indexing. The pallets may collect at any given work station merely on the basis of their own intelligence of what is happening at that station quite apart from the machine cycle times of any other station. This permits the faster machines to operate extremely efficiently with the workpieces collecting at the slower machines. With appropriate alternate route conveying to bypass the slower machine in such an instance to other machines under computer control, the efficiency of the overall line is greatly enhanced.

Turning to the prior art of specific conveyor structure, tilted rollers have been used in the past for conveying cylindrical workpieces but this prior art is only remotely relevant to the present conveyor environment. For example, in the Dreher U.S. Pat. No. 3,718,247 three driven rotating rollers, positioned on tilted axes, engage the exterior surface of a cylindrical tube and cause the tube to move axially. A similar system is shown in the Hamilton U.S. Pat. No. 3,642,041.

Other fringe prior art includes a linear actuator made by Barry Wright Corporation called a "Roh-lex" linear actuator which uses rollers engaging the exterior surface of a rotating rod to move a carriage. This arrangement is shown in U.S. Pat. No. 3,272,021. My U.S. Pat. No. 3,591,241 relating to vehicle drives shows tilted rollers for driving a vehicle.

It is a primary object of the present invention to provide a "floating" conveyor system of the type described that permits workpieces to move rapidly through the faster work stations and to collect at the slower work stations or other junction points.

SUMMARY OF THE PRESENT INVENTION

In accordance with the present invention, a conveyor system is provided for conveying workpieces from one work station to another along a machine line where the movement of the workpieces is controlled in part by the movement of the preceding workpiece rather than by the cycle times of all of the machines in the line.

Toward this end the conveyor is made up of a plurality of independently controlled sections that are approximately four or five feet in length. Each section has an elongated axially rotatable frame with annular projections having angularly related rotatable resilient rollers spaced thereon. The rollers on one annular projection are spaced so that they lie in a common helix with the rollers on the adjacent annular projections on the same elongated frame. As the frame rotates by its individually operable drive, the resilient rollers engage a semi-cylindrical undersurface on the work carrier to drive the work carrier in a semi-positive or non-positive manner. That is, if two adjacent in-line conveyor sections are rotating at the same speed, as the work pallet travels from one to the other, the transfer will occur in a substantially positive manner, but since the two sections may be rotationally out of phase, i.e., their geometric helix being out of phase or more commonly the two sections are rotating at different speeds, some slippage may occur, and this is permitted by the semi-positive drive provided by the resilient rollers.

This spiral roller drive normally has pure rolling motion on the semi-cylindrical undersurface of the workholders or pallets. However, in the event that adjacent workholders engage one another, or in the event that a pallet moves from one conveyor section to another having a different speed of rotation common, the rollers will merely slide on the semi-cylindrical undersurfaces and without damage until the pallet assumes the speed of the conveyor section it is being driven by.

Another advantage of this spiral roller drive is that the workholders may be easily entered into the conveyor system merely by lowering the workholder onto any one of the spiral roller sections without the need for any special attachment.

A control system is provided that senses the approach of a workpiece to a work station and slows and stops the conveyor drive section adjacent the work station as the work pallet arrives there. The control thereafter senses the approach of the next following work pallet. It stops that work pallet in the drive section adjacent to the drive section next to the work station so long as there is a work pallet at the work station. The control operates to sense the approach of still further work pallets and stops these work pallets at succeeding conveyor sections. Since in this system one conveyor drive section may be operating at a different speed than an immediately adjacent drive section, the non-positive drive provided by the individual sections and their rubber rollers permit this differential speed without any binding of the pallet.

The control system is further operable upon completion of the machining cycle to drive the work pallet from the station toward the next station and to automatically start the adjacent conveyor sections with work pallets thereon to move them to the next vacated conveyor sections.

DETAILED DESCRIPTION OF THE PREFERRED EMBODIMENT

Figure 1:
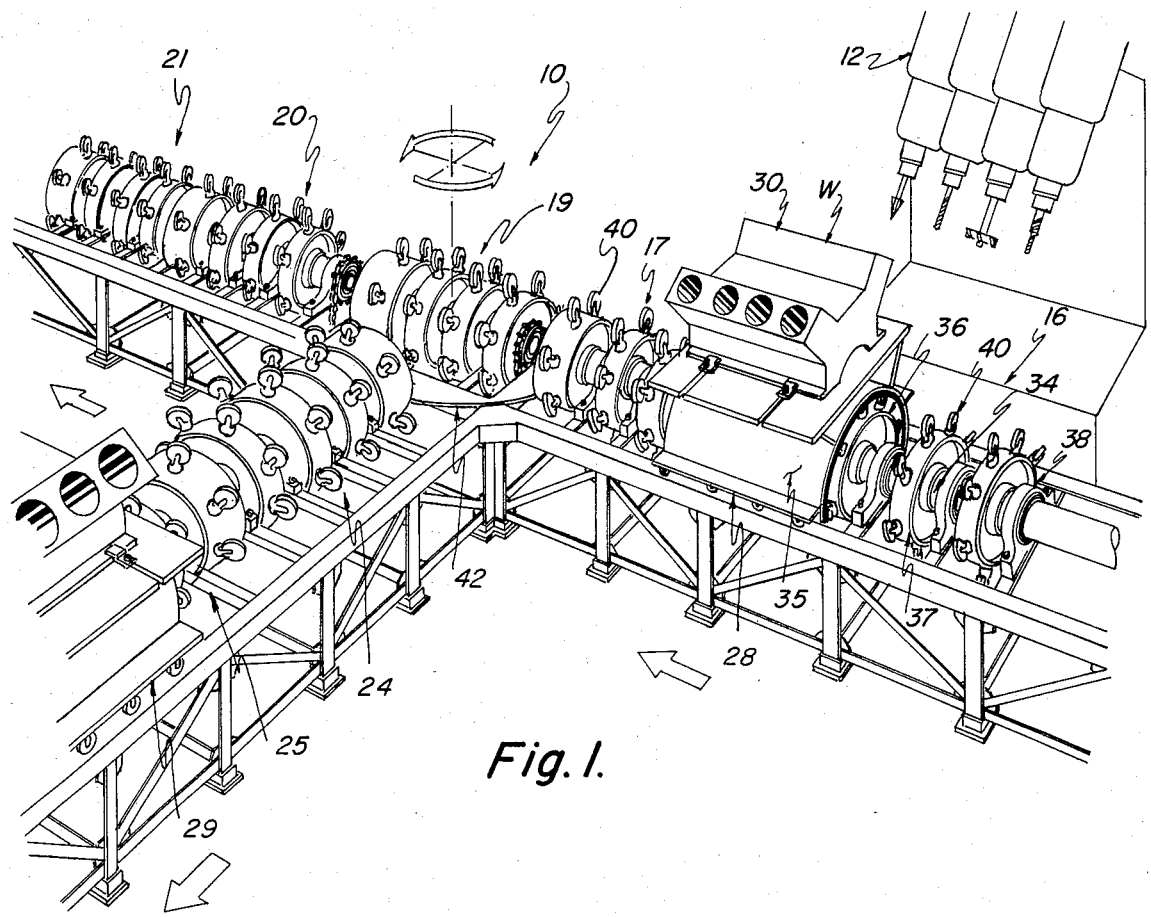
FIG. 1 is a perspective view of a section of the present conveyor system illustrating several work pallets moving on the conveyor between machining stations including a transfer turntable in the conveyor for alternative routing.

Referring to the drawings and particularly FIG. 1 a perspective view of a portion of the present conveyor system is illustrated. The present conveyor system is particularly adapted for conveying individually palletized workpieces from one machine to another in an automated machining system. One such system for which the present conveyor system is particularly adapted is referred to as an automated batch manufacturing system, also ABMS. This term somewhat coloquially refers to automated manufacturing systems including a plurality of separately operable and programmable machining stations with an automatically controlled conveyor apparatus for transporting workpieces from one machine to another and which the workpieces are consecutively identical only in very limited numbers, for example, 25 to 200 workpieces, so the machines and the conveyor must be reprogrammed after relatively short intervals. The present conveyor system, however, has applications beyond automated batch manufacturing systems and has utility in manufacturing systems where a high volume of identical workpieces proceeds through the manufacturing system particularly where workpiece routing and individual workpiece control is desirable.

Viewing FIG. 1, the present conveyor system 10 is illustrated in association with a drilling machine 12. The conveyor 10 consists of a plurality of independently operable conveying units 16, 17, 19, 20, 21, 24, and 25 in the portion of the total conveyor system illustrated in FIG. 1. The conveyor system 10 moves pallets such as indicated at 28 and 29 from one machine to another throughout the system under individual control. Pallets 28 and 29 have workpieces 30 and 31 fixed thereto to be machined at the various machining stations throughout the system. It should be understood that FIG. 1 illustrates only a portion of the total manufacturing system and that the complete system would include many more individual conveyor units with perhaps 30 or 40 individual machining stations and many work pallets. The machines as well as the broad routing functions of the workpieces throughout the system are programmed by a central computer in a manner now well known to the automated manufacturing art and while the details of such controls and programming are not shown and form no part of the present invention it should be understood that the conveyor system disclosed herein including the controls illustrated for the conveyor form the essence of the present invention and they are particularly adaptable to manufacturing systems controlled by such central programming facilities.

Each of the conveyor units 16 through 25 has an independently rotatable frame 34 with four integral annular hubs 35, 36, 37, and 38 carried thereby each supporting eight annularly arrayed roller assemblies 40. These roller assemblies are all positioned to rotate on the same helix angle and as they engage the underside of the pallets 28 and 29 they propel the pallets along the conveyor 10.

The conveyor section 19 has a rotatable turntable 42 that permits a work pallet on section 19 to be delivered selectively either to conveyor section 20 toward machine 13 or to conveyor section 24 after a 90 degree rotation from the position shown on FIG. 1 to other machining stations not illustrated.

Figure 2:
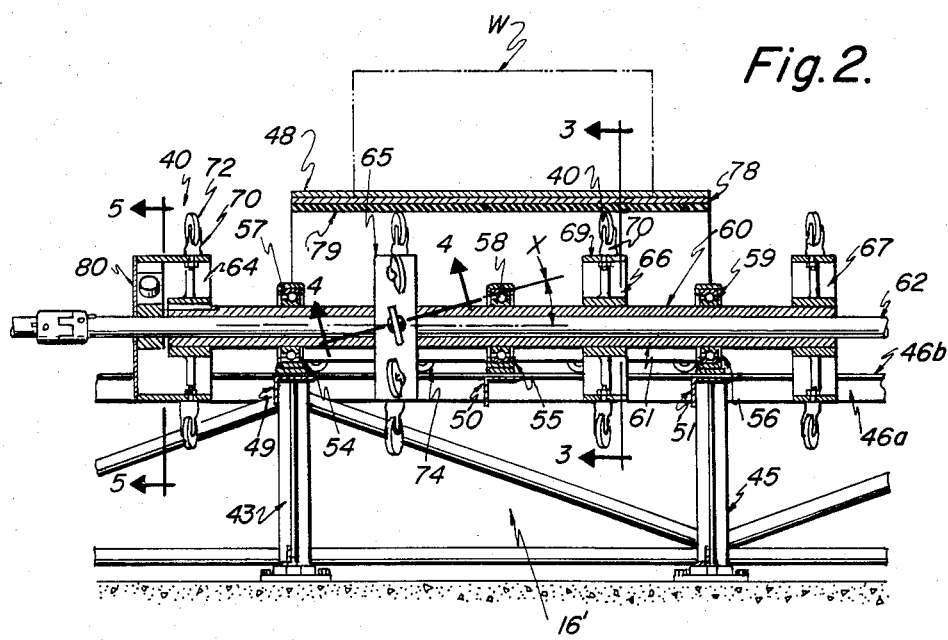
FIG. 2 is a side view, partly in section, of one of the independently operable conveyor sections with a pallet riding in the conveyor section.
Figure 3:
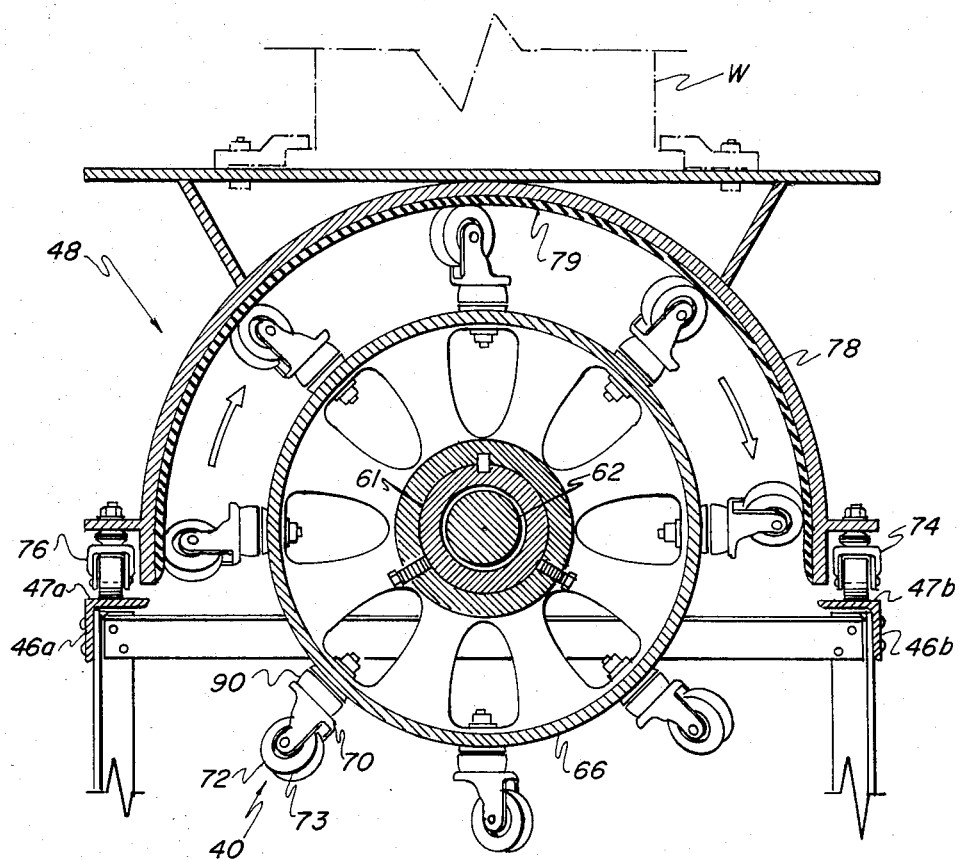
FIG. 3 is a cross-section of one of the conveyor sections, taken generally along line 3—3 of FIG. 2, illustrating the spirally conveyed roller assemblies and the rolling engagement with the semi-cylindrical undersurface of the pallet.
Figure 4:
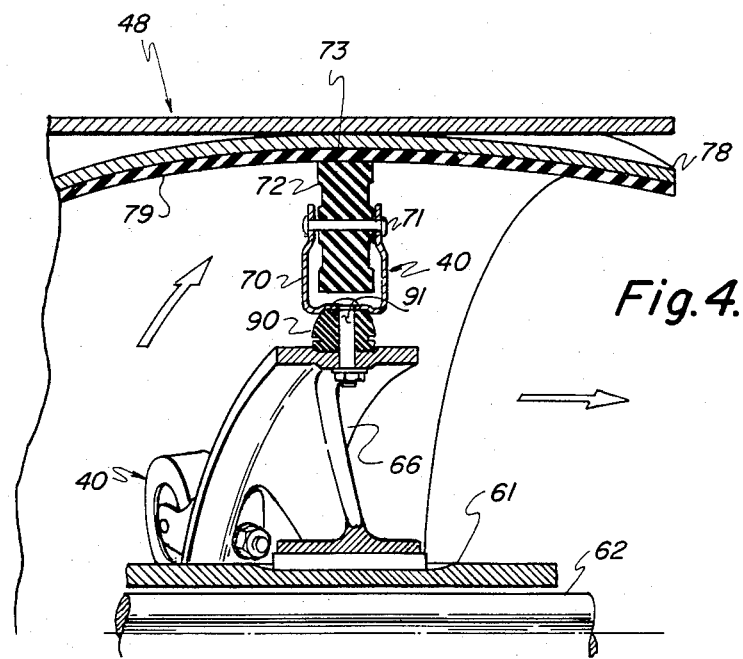
FIG. 4 is a fragmentary section through one of the roller assemblies taken generally along line 4—4 of FIG. 2.

The operation of the present conveyor will be more readily apparent from viewing the construction of one of the conveyor stations illustrated in FIGS. 2, 3, and 4. It should be understood that conveyor section 16' illustrated in FIGS. 2, 3, and 4 is identical to the individual conveyor sections throughout the system with the exception of the transfer conveyor sections 19 which are substantially the same except for the addition of turntable 42 which permits rotation of the conveyor section to accomodate for alternative delivery directions.

Viewing FIG. 2 conveyor section 16' is seen to include upright frame members 43 and 45 bolted to the floor and carrying at their upper ends fixed and spaced horizontal pallet guideways 46 and 46a. The horizontal guideways 46 and 46a have flat horizontal surfaces 47a and 47b upon which work pallets such as pallet 48 are supported and roll. Frame members 43 and 45 together with guideways 46a and 46b have cross members 49, 50, and 51 fixed thereto that support an upwardly extending central bearing bosses 54, 55, and 56 having ballbearing assemblies 57, 58, and 59 which rotatably receive conveyor unit frame 60. The rotatable conveyor unit frame 60 consists of an elongated tubular portion 61 that surrounds a central drive shaft 62.

Drive shaft 62 extends throughout the conveyor system and is continuously rotated by a single drive unit. The individual control of each of the conveyor units such as shown at 16' is effected by selectively clutching individual ones of the conveyor frames 60 to the shaft 62. Frame 60 also includes four integral annular hubs 64, 65, 66, and 67 (corresponding to hubs 35, 36, 37, and 38 in FIG. 1) Each of these hubs, such as hub 66 (second from the right in FIG. 2) has an annular mounting surface portion 69 upon which eight roller assemblies 40 are mounted in equi-angular positions.

As seen in FIGS. 2, 3, and 4, each of the roller assemblies includes a "U" shaped horn member 70 fixed to mounting surface 69 with a resilient rubber grommet 90 therebetween for shock absorbtion. A fastener 91 extends through horn 70 with a nonrotational fit, through grommet 90 and through hub surface 69 with a nonrotational fit preventing rotation of the horn 70 with respect to the hub 66. The horn 70 has an axle or pin 71 extending therethrough freely rotatably supporting a rubber roller 72.

The rollers 72 are substantially cylindrical in configuration and constructed of molded rubber having a substantially cylindrical outer surface 73 that constitutes the driving surface between the roller 72 and the pallets 48.

As seen best on the fully drawn hub 65 in FIG. 2, each axle 71 when positioned in the horizontal plane of shaft 62 and viewed from the side view of FIG. 2 is angularly related with respect to the axis of shaft 62 at approximately 10 to 15 degrees indicated by the angle "x". The fixed angular relationship of the rollers 72 to the frame 60 provides the "helical" or "spiral" drive that causes rollers 72 to drive the pallets 28, 29, and 48 forwardly along the conveyor. The pallets 48 are actually supported partly in both horizontal and vertical directions by the rollers 72 as they move through conveyor system. That is, the weight of the work piece and work pallet provide the driving force on the rollers 72. The remaining vertical support is provided by the stationary guideways 46a and 46b at both sides of the conveyor.

As best seen in FIGS. 2, 3, and 4, pallets 48 roll along the stationary frame rails 47a and 47b as they are being driven by the engagement of rollers 72 on the underside of the pallets. As viewed in FIGS. 2 and 3 the pallets 48 have four spaced cylindrical roller assemblies 74 with cylindrical rollers on the right side thereof as viewed in FIG. 3 having rolling engagement with upper surface 47b of conveyor frame guideway 46b. The left side of pallets 48 carries four identical spaced roller assemblies 75 having cylindrical wheels which have rolling contact on flat horizontal upper surface 47a of the left conveyor frame guideway 46a as viewed in FIG. 3. Vertical guideways (not shown) may be provided extending upwardly from surfaces 47a and 47b engaging the sides of wheels in assemblies 74 and 76 to provide improved lateral guiding for the pallets.

The lower portions or undersurface of the pallets 48 have a substantially semi-cylindrical plate 78 fixed thereto extending throughout the length of the pallet. Plate 78 has bonded thereto a rubber liner 79 providing a high coefficient of friction with rubber rollers 72 and also a sufficient thickness to provide some shock absorbing characteristic. The inner surface of the rubber liner 79 has a radius about the center-line of shaft 62 slightly greater than the radius of the path scribed by the radially outer edge of rollers 72 about the same centerline of shaft 62 to provide smooth entry contact of rollers 72 as they move up into engagement with the rubber liner 79.

The engagement of the roller assemblies 40 with the liner 79 is illustrated in FIG. 4 as they roll on the underside of a work pallet 48. Since FIG. 4 is a partial cross-section taken in a plane containing the axis of one of the roller assemblies and intersecting the axis of shaft 62 at a right angle, the sectional edges of the semi-cylindrical plate 78 and the semi-cylindrical rubber liner 79 on the undersurface of pallet 48—appear as partial elipses in the view. The dimensional relationships shown in FIG. 4 are achieved with substantially the following dimensions: wheel 72—1" diameter; hub 66—4" outer diameter; shaft 62—$\frac{3}{4}$" diameter; outer diameter of the radially outer-most surface of roller 72 about the axis of shaft 62—7 9/16"; inner radius of liner 79—3 27/32"; and with the rollers positioned so a plane containing the axis or rotation of the roller 72 and intersecting the axis of shaft 62 at a right angle (i.e., the plane of FIG. 4) defines an angle of approximately 11.5 degrees with a plane containing the axis of shaft 62 and passing through the roller 72 at its midpoint. This latter statement accurately describes the specific geometry of the roller assemblies.

As may be viewed in FIG. 4, the 11.5 degree helix on the roller assemblies provides a very "soft" curve in the liner 79 as "seen" by the rollers as they roll on the inner surface of the liner. This assures pure rolling motion of the rollers on the liner and also increases the frictional drive force between the outer surface 73 of roller 72 since the outer surface 73 has complete axial line contact with liner 79.

With specific dimensional geometry described above, with eight rollers on each hub, four hubs in each conveyor unit and with the length of the pallet being at least equal to twice the distance between the hubs, there would be between six and twelve roller assemblies driving the pallet 48 at all times providing a very smooth ride for pallets.

Figure 5:
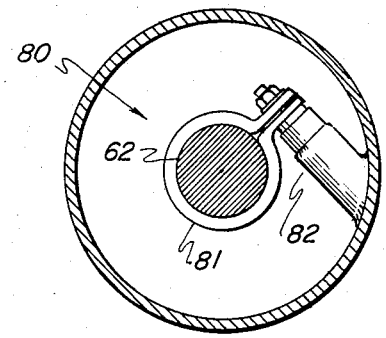
FIG. 5 is a cross-section taken generally along line 4—4 of FIG. 2, showing one of the clutch assemblies associated with each of the conveyor sections.

Individual control of the work pallets 48 as they move through the conveyor system is achieved by the selective clutching of the individual unit conveyor sections to the continuously rotating shaft 62. Clutching of the units to shaft 62 is controlled either by the master computer controlling routing of the work pallets through the system or the work station approach controls described with respect to FIG. 6 and FIG. 7. As seen in FIGS. 2 and 5 a clutch assembly 80 is provided for each of the conveyor sections for connecting and disconnecting the conveyor section to be rotated by shaft 62. With clutch 80 disengaged and with a pallet 48 riding on the conveyor section at the time of this engagement, the conveyor section will rapidly cease rotating due to the inherent braking effect of this conveyor and the pallet 48 will similarly rapidly cease its movement along the conveyor. When the clutch 80 is subsequently engaged the work pallet 80 will begin again its movement along the conveyor driven by the rollers 72. As seen in FIG. 5 clutch 80 includes a split annular clutch member 81 selectively actuated into engagement with shaft 62 by a clutch solenoid 82.

From the above description it will be apparent that as the conveyor section rotates with the drive shaft 62 when clutch 80 is engaged, the rollers 72 are freely rotatable on frame hubs 64, 65, 66, and 67 about an axis having a helix angle with the axis of shaft 62 of approximately 11 to 15 degrees. Peripheral surfaces 73 of the rollers 72 enter and engage continuously the semi-cylindrical rubber liner 79 normally with pure rolling motion. It is important to note that the rollers 72 do not actually push against any surface on the pallets 48, but instead it is simply the frictional engagement between the outer surface 73 of the roller 72 and the inner surface of the rubber liner 79 in pure rolling contact that provides the necessary frictional force to drive the pallet 48 forward.

The coefficient friction between the outer surface 73 of the roller and the inner surface of the liner 79 is selected such that the roller 72 will slip on the liner surface of the liner 79 upon a sufficient axially retarding force on the pallet 48 substantially below the stall torque of the main drive shaft 62. For example, as a work pallet 48 moves from one conveyor section to another the conveyor sections are frequently rotating at different speeds because the individual conveyor sections are continuously starting or stopping rotation to control the speed of individual work pallets 48 throughout the conveyor system. Thus as the work pallet 48 moves from one conveyor section rotating at a speed of approximately 50 rpm for example, to an adjacent conveyor section rotating at a slower speed, for example 30 rpm, the rollers on one of the conveyor sections, or both, will slip somewhat without causing any significant binding while at the same time continuing the propulsion of the pallet until the rollers on the adjacent section cease slipping and obtain the normal pure rolling motion on the rubber liner 79 of the pallet undersurface.

Figure 6:
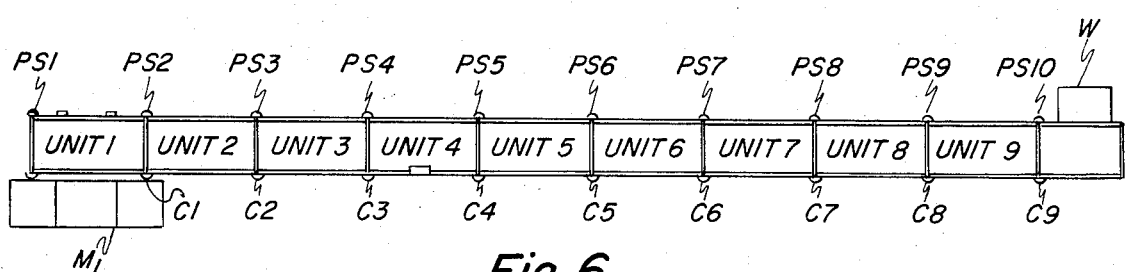
FIG. 6 is a top diagramatic view of a portion of the present conveyor system, particularly illustrating an approach portion of the conveyor to a machine station.
Figure 7:
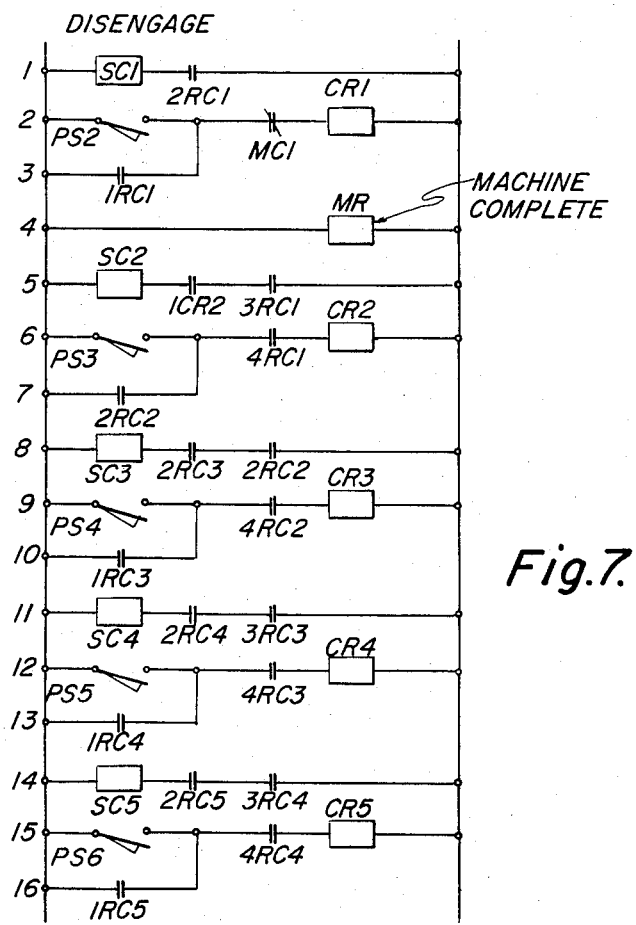
FIG. 7 is a control circuit for the approach portion of the conveyor shown in FIG. 5.

In some instances, adjacent pallets 48 may actually come into contact with one another due to improper control by the central computer or by malfunctioning of the various approach controls disclosed in conjunction with FIGS. 6 and 7. In such an event one or both of the pallets will slip on their mating driving rollers 72 until the control conditions stablizes or the conveyor is shut down, without any significant damage to the pallets or their associated work pieces.

WORK STATION APPROACH AND CONTROLS OF FIGS. 6 AND 7

FIG. 6 illustrates in diagramatic form an approach section of the present conveyor to an exemplary machining station. The conveyor section illustration includes nine conveyor units, designated unit 1 through unit 9 in FIG. 5. Each of these conveyor units is substantially identical to the unit or section 16 illustrated in FIG. 2 so it should be understood that each is independently operable and has its own clutch designated $C_1$ through $C_9$ in FIG. 6 corresponding to clutch 80 in FIGS. 2 and 4. For example, $C_1$ is the clutch associated with unit 1 and upon actuation it connects unit 1 to the continuously rotating drive shaft of the conveyor thereby driving unit 1 in rotation and propelling any pallet forward riding on that unit. Clutches $C_2$ through $C_9$ control rotation of units 2 through 9 in a similar fashion.

Ten limit switches are fixed to the stationary frame of the conveyor in a position such that they will be actuated by the pallets as they travel along the conveyor. PS2, for example, is positioned so that it is actuated by a pallet as it leaves unit 2 and enters unit 1. Similarly PS3 is actuated by a pallet as it leaves unit 3 and enters unit 2. The remaining switches PS4 through PS10 are similarly positioned to be actuated by pallets as they leave one unit and enter the next succeding unit.

The conveyor, and particularly the direction of rotation of shaft 62 and the direction of the axis of the rollers 72 are arranged so that pallets move from right to left as seen in FIG. 5. A machining station is designated $M_1$ and is shown in schematic form in FIG. 6.

It should be understood that the present conveyor system is particularly adaptable for use with computer controlled manufacturing systems. Where the machine functions are programmed into the machine as desired as the pallets flow through the system the pallets may be individually transferred to different lines to most efficiently control the flow of pallets and work in process through the system. Toward this end a control circuit, shown in FIG. 7, is provided for controlling the movement of the pallets as they approach each machine station. It should be understood that the circuit in FIG. 7 is only exemplary of a similar circuit employed in association with each of the machining stations throughout the manufacturing system. A similar circuit is provided for the approach to the turntable transfer station shown in FIG. 1. Basically the purpose of the control circuit of FIG. 7 when used in conjunction with the conveyor approach section illustrated in FIG. 6 is to permit a pallet to approach—without stopping—the machine station when no pallets are between that pallet and the machining station, and also to permit the pallets to accumulate or "stand in line" in front of the machining station when there are 1, 2, or up to 9 or more pallets standing in line. For example, viewing FIG. 5, assuming a pallet enters unit 9 from the right with no work pallet in front of it, this pallet will proceed continuously through units 8, 7, 6, 5, 4, 3, 2 and into unit 1 without stopping until it arrives in unit 1 at the machining station, $M_1$, where the pallet will stop in preparation to be machined. With a pallet in the machining station at unit 1 the next succeding pallet entering from the right will pass continuously through units 9, 8, 7, 6, 5, 4, 3 and will stop in unit 2. Similarly additional pallets entering from the right will stop individually in adjacent units 3, 4, 5, 6, 7, 8, and 9, in that order.

With the pallets stacked in this fashion, each in one conveyor unit, and when the machining cycle at $M_1$ is complete, unit 1 will be activated by a "machine complete" signal from the master computer and the pallet in unit 1 will be driven toward the next work station. In response to this, unit 2 will be energized to drive the pallet in that unit into unit 1 for machining and at the same time each of the following units 3, 4, 5, 6, 7, 8, and 9 will be energized to drive the pallets in those units to the adjacent unit where they will be stopped until the pallet then in the machining station (formerly stored in unit 2) has been completed.

The control circuit illustrated in FIG. 7 is somewhat incomplete with respect to the control switches and clutches illustrated in FIG. 6 in that is is applicable only to conveyor units 1 through 5 but it should be understood that repetitive circuitry identical in design is provided for units 6, 7, 8, and 9.

Viewing the circuit shown in FIGS. 6 and 7, the clutches $C_1$ through $C_5$ are normally actuated clutches, ie., the clutches are normally positioned to connect the corresponding conveyor unit to the continuously rotating central drive shaft 62 and when their associated clutch solenoids, $SC_1$ to $SC_5$, are actuated their clutch elements become disengaged releasing the unit from the drive shaft 62 permitting the unit to cease rotation.

When switch PS2, line 2, is closed as a workpiece passes from unit 2 to unit 1 adjacent the machining station $M_1$, contact relay CR1 will be actuated closing holding contacts 1RC1 in line 3, permitting switch PS2 to drop out as the pallet over-rides the switch as it enters conveyor unit 1. The energization of contact relay CR1 closes its contacts 2RC1 in line 1, actuating clutch release solenoid SC1 releasing unit 1 from the shaft and permitting unit 1 to cease rotation (assisted by the drag force of the pallet acting on the rollers 72 in unit 1) stopping the work pallet at the work station in preparation for a machining cycle. As another work pallet then approaches unit 2 from unit 3 with a pallet holding in unit 1, switch PS3 in line 6 will be actuated energizing relay CR2 closing holding contacts 2RC2 in line 7. This closes contacts 1RC2 in line 5 actuating disengagement solenoid SC2 associated with clutch $C_2$. Under these conditions relay contacts 3RC1 are closed and they are closed only if contact relay CR1 in line 2 is energized indicating the presence of a pallet in the machining station. Otherwise unit 2 would continue rotating driving the pallet into the machining station.

Upon completion of the machining cycle in station $M_1$ the central computer energizes contact relay MR in line 4 indicating machining complete and this opens normally closed contacts $MC_1$ in line 2 deenergizing contact relay CR2 dropping out holding contacts 1RC1 in line 3 and opening relay contact 2RC1 in line 1 deenergizing the disengage solenoid SC1 permitting clutch $C_1$ to actuate rotating conveyor unit 1 and driving the pallet out of the machining station.

At the same time the deenergization of contact relay CR1 opens relay contacts 3RC1 in line 5 deactuating clutch solenoid SC2 causing clutch $C_2$ to actuate rotating unit 2 and driving the pallet in unit 2 into unit 1 where it will be stopped upon actuation of switch PS2 as it moves into that unit.

Assuming that a pallet is in unit 2, a pallet approaching unit 3 will energize PS4 closing contact relay CR3 and closing its holding contacts 1RC3.

This closes contacts 2RC3, and assuming that a pallet is in unit 2 contacts 3RC2 will be closed and clutch disengage solenoid SC3 in line 8 will be energizing thereby stopping the pallet in unit 3. When the pallet in unit 2 is moved from unit 2 toward the machining station as described above relay contact 3RC2 will open deenergizing solenoid SC3 initiating rotation of conveyor unit 3 thereby moving the pallet from unit 3 into unit 2.

Similar functions are performed by the remaining units in advancing the pallets from their units to the next succeeding unit. For example, if there is a pallet "holding" in unit 4 contact relay CR4 would have been energized by the closure of PS5 and holding contacts 1RCR4 closed energizing the clutch disengage solenoid SC4 through relay contacts 2RC4 and 3RC3 in line 11. But when a pallet moves from unit 3 to unit 2 contact relay CR3 in line 9 becomes deenergized opening its contact 3RC3 in line 11 dropping out solenoid SC4 in the same line thereby deenergizing SC4 and engaging clutch $C_4$ rotating conveyor unit 4 and driving the workpiece from unit 4 to unit 3, or directly to the station if no pallets remain in any units between unit 4 and the station.

A similar circuit is provided for conveyor unit 5 in lines 14, 15, and 16 in FIG. 7 wherein a pallet closes PS6 when moving from conveyor unit 6 to conveyor unit 5. Contact relay CR5 will be energized closing its holding contacts 1RC5. This energizes clutch disengaged solenoid SC5 through contacts 2RC5 if contacts 3RC4 are energized in line 14 indicating the presence of a work pallet in unit 4. When unit 4 becomes empty relay CR4 in line 12 will become deenergized opening its contacts 3RC4 in line 14 thereby deenergizing the clutch solenoid SC5 actuating clutch $C_5$ for unit 5 and driving the pallet from unit 5 into unit 4 or as described above directly through to the machining station $M_1$ if no pallets are located therebetween. Similar circuitry is provided for conveyor units 6, 7, 8, and 9.

Figure 8:
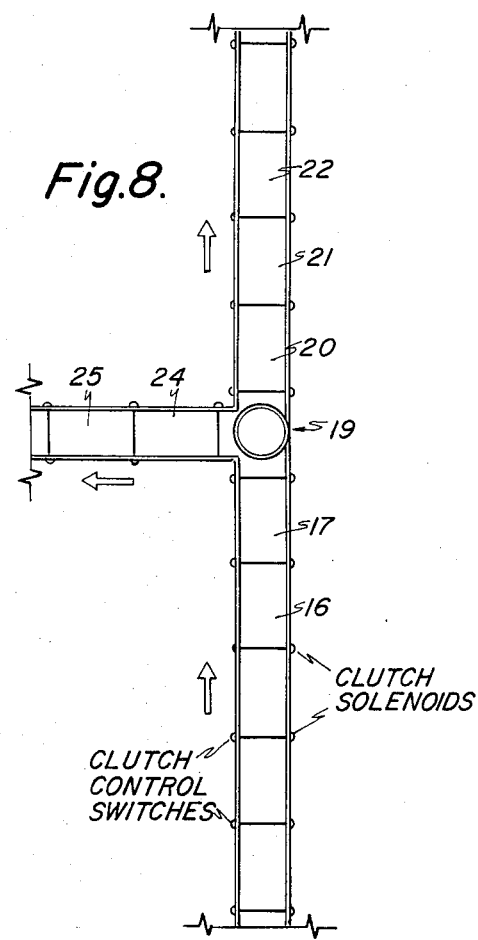
FIG. 8 is a diagramatic view of a portion of the conveyor particularly illustrating the sections adjacent a transfer station.

In FIG. 8 a transfer area of the conveyor is diagramatically shown illustrating the transfer section 19 positioned in the same manner as in FIG. 1. Clutch control solenoids for the conveyor sections are illustrated along with their corresponding control switches. It should be understood that circuit similar to the one shown in FIG. 7 is provided for the transfer section with the addition of a control for the actuation of the turntable 42 under the command of the master computer.

What is claimed is:

1. A conveyor system for conveying articles, comprising; a plurality of workholders movable in a predetermined path, means for moving said workholders including a plurality of separate drive sections, independent drive means for each of said drive sections, said drive sections having non-positive drive means engaging said workholders so that the workholders may move at different speeds than the drive means under a sufficient force, control means for selectively actuating said drive means to control said drive sections to slow or stop some of said workholders while continuing movement of other of said workholders, each of said drive sections including an elongated frame mounted for rotation about said predetermined path, a drive shaft extending through said frame, and clutch means for selectively connecting said drive shaft to said frame, said control means being connected to control said clutch.

2. A conveyor system for moving a plurality of workholders along a predetermined path, comprising; a main frame, a shaft in the frame rotatable about an axis generally parallel to the intended path of movement of the workholders, means for rotating the shaft, a drive frame mounted on said shaft for rotation therewith, a plurality of rollers on said drive frame positioned the same distance from the axis of the shaft, said rollers being mounted for rotation about an axis angularly related to the axis of the shaft, workholders on the main frame mounted for movement parallel to the axis of rotation of the shaft, said workholders each having a drive surface contoured to engage the surface of the rollers so that the rollers have rolling and driving contact therewith, and interengaging guide surfaces between the workholders and the main frame to prevent rotation of the workholders about the axis of the shaft.

3. A conveyor system for moving a plurality of workholders along a predetermined path as claimed in claim 2, when the contoured drive surface in the workholders is substantially semi-cylindrical.

4. A conveyor system, for moving a plurality of workholders between fixed work stations along a predetermined path, comprising; a main conveyor frame, shaft means in said frame extending along the intended path of the workholders, means for rotating the shaft means about an axis parallel with the workholder path, a plurality of adjacent conveyor frame sections mounted for rotation on the shaft means along the predetermined path, clutch means for selectively connecting the frame sections for rotation with the shaft means, each of said frame sections having a plurality of roller assemblies mounted about the periphery thereof, each of said roller assemblies having a roller mounted for rotation about a fixed axis positioned less than 90 degrees with respect to the axis of the shaft means, a plurality of workholders on said main frame for movement along the predetermined path, said workholder having a length less than the length of each frame section, said workholders having a downwardly facing semi-cylindrical surface engaging the periphery of the rollers to be driven thereby with rolling contact, and control means for activating the clutch means selectively to control movement of each workholder independently of one another.

5. A conveyor system for conveying articles, comprising; a plurality of workholders movable in a predetermined path, means for moving the workholders including a plurality of separate drive sections, said drive sections having means engageable with the workholders to drive the workholders along said path, a drive shaft extending along the path, means for selectively engaging the drive sections to be driven by the drive shaft to control movement of the workholders along the path said drive sections being rotatable around said drive shaft, and said means for selectively engaging the drive section to be driven by the drive shaft, including a clutch adjacent each of the drive sections to selectively cause the drive sections to rotate with the drive shaft.

* * * * *